United States Patent
Shao et al.

(10) Patent No.: US 12,093,903 B2
(45) Date of Patent: *Sep. 17, 2024

(54) METHOD AND INTERNET OF THINGS SYSTEM FOR DETERMINING GAS METER MAINTENANCE PLAN OF SMART GAS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Lei Zhang, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,457

(22) Filed: Aug. 8, 2023

(65) Prior Publication Data
US 2023/0385783 A1 Nov. 30, 2023

Related U.S. Application Data (63) Continuation of application No. 18/054,926, filed on Nov. 14, 2022, now Pat. No. 11,861,567.

(30) Foreign Application Priority Data

Oct. 14, 2022 (CN) .......................... 202211256468.8

(51) Int. Cl.
*G06Q 10/20* (2023.01)
*F17D 5/02* (2006.01)
(Continued)

(52) U.S. Cl.
CPC ............... *G06Q 10/20* (2013.01); *F17D 5/02* (2013.01); *G01F 25/15* (2022.01); *G16Y 10/35* (2020.01)

(58) Field of Classification Search
None
See application file for complete search history.

(56) References Cited

U.S. PATENT DOCUMENTS

| | | | |
|---|---|---|---|
| 11,861,567 B2 * | 1/2024 | Shao | G16Y 10/35 |
| 2008/0024318 A1 | 1/2008 | Hall et al. | |

(Continued)

FOREIGN PATENT DOCUMENTS

| | | |
|---|---|---|
| CN | 104314731 A | 1/2015 |
| CN | 105561513 A | 5/2016 |

(Continued)

OTHER PUBLICATIONS

Yu, Minjie, Development Status of Smart Gas Meter under the Background of Big Data, The Journal of New Industrialization, 2021, 3 pages.

(Continued)

*Primary Examiner* — Roy Y Yi
(74) *Attorney, Agent, or Firm* — METIS IP LLC (57) ABSTRACT

The embodiments of the present disclosure provide a method and an Internet of Things (IoT) system for determining a gas meter measurement failure of a smart gas, the method including: by the smart gas data center, obtaining, based on the smart gas sensing network platform, gas flow information of pipelines of each level from at least one flow monitoring device, the at least one flow monitoring device being configured in the smart gas object platform; by the indoor smart gas device management sub-platform, determining a candidate area based on the gas flow information; determining a target gas meter based on gas meter reading (Continued)

information of the candidate area, and then determining a maintenance plan for the target gas meter; and sending the maintenance plan to the smart gas data center, and sending the maintenance plan to the smart gas user platform based on the smart gas service platform.

11 Claims, 5 Drawing Sheets

(51) Int. Cl.
*G01F 25/10* (2022.01)
*G16Y 10/35* (2020.01)

(56) References Cited

U.S. PATENT DOCUMENTS

| | | |
|---|---|---|
| 2013/0157653 A1 | 6/2013 | Huang et al. |
| 2016/0050583 A1 | 2/2016 | Huang et al. |
| 2018/0136180 A1 | 5/2018 | Chou |
| 2018/0246780 A1 | 8/2018 | Acharya et al. |

FOREIGN PATENT DOCUMENTS

| | | |
|---|---|---|
| CN | 105872032 A | 8/2016 |
| CN | 106657306 A | 5/2017 |
| CN | 106871983 A | 6/2017 |
| CN | 107120533 A | 9/2017 |
| CN | 107606489 A | 1/2018 |
| CN | 107621298 A | 1/2018 |
| CN | 107643115 A | 1/2018 |
| CN | 107705013 A | 2/2018 |
| CN | 107917741 A | 4/2018 |
| CN | 107993015 A | 5/2018 |
| CN | 108108665 A | 6/2018 |
| CN | 108258804 A | 7/2018 |
| CN | 108305009 A | 7/2018 |
| CN | 108444578 A | 8/2018 |
| CN | 108764681 A | 11/2018 |
| CN | 109114434 A | 1/2019 |
| CN | 109188970 A | 1/2019 |
| CN | 109239265 A | 1/2019 |
| CN | 109253768 A | 1/2019 |
| CN | 109470289 A | 3/2019 |
| CN | 110009252 A | 7/2019 |
| CN | 110661861 A | 1/2020 |
| CN | 110686746 A | 1/2020 |
| CN | 110848988 A | 2/2020 |
| CN | 111503523 A | 8/2020 |
| CN | 111862542 A | 10/2020 |
| CN | 111882167 A | 11/2020 |
| CN | 111954794 A | 11/2020 |
| CN | 112561726 A | 3/2021 |
| CN | 112907388 A | 6/2021 |
| CN | 113011847 A | 6/2021 |
| CN | 113141545 A | 7/2021 |
| CN | 113259483 A | 8/2021 |
| CN | 113324181 A | 8/2021 |
| CN | 113395299 A | 9/2021 |
| CN | 113965591 A | 1/2022 |
| CN | 114390079 A | 4/2022 |
| CN | 114429315 A | 5/2022 |
| CN | 114943482 A | 8/2022 |
| EP | 3542521 A1 | 9/2019 |

OTHER PUBLICATIONS

"Gas Science | Take you to know the gas valve", Web page <https://new.qq.com/rain/a/20210316a0c9iq00>, Mar. 16, 2021.
"Gas Pipeline Network Monitoring System", Web page <http://www.hrbshengchang.com/proshow-7-32-1.html>, Jun. 17, 2020.
"City Gas Pipeline Network Monitoring System Solution", Web page <https://zhuanlan.zhihu.com/p/381752039>, Jun. 18, 2021.
Notification to Grant Patent Right for Invention in Chinese Application No. 202211256468.8 mailed on Jan. 12, 2023, 11 pages.
First Office Action in Chinese Application No. 202211256468.8 mailed on Dec. 12, 2022, 17 pages.

* cited by examiner

210 — By the smart gas data center, obtaining, based on a smart gas sensing network platform, gas flow information data of each level of pipelines from at least one flow monitoring device 220 — Determining a candidate area based on the gas flow information 230 — Determining a target gas meter based on gas meter reading information in the candidate area, and then determine a maintenance plan of the target gas meter 240 — Sending the maintenance plan to the smart gas data center, and sending the maintenance plan to the smart gas user platform based on the smart gas service platform

METHOD AND INTERNET OF THINGS SYSTEM FOR DETERMINING GAS METER MAINTENANCE PLAN OF SMART GAS

CROSS-REFERENCE TO RELATED APPLICATION

This application is a Continuation of U.S. patent application Ser. No. 18/054,926, filed on Nov. 14, 2022, which claims priority of Chinese Patent Application No. 202211256468.8, filed on Oct. 14, 2022, the contents of which are entirely incorporated herein by reference.

TECHNICAL FIELD

The present disclosure involves the field of a gas meter, and in particular, involves a method and Internet of Things (IoT) system for determining gas meter maintenance plan of smart gas.

BACKGROUND

A measurement accuracy of a gas meter has always been a hot issue for a gas user and a gas company. An inaccurate measurement of the gas meter leads to an inability to use gas fairly, which may not only cause losses to the gas user, but also cause losses to the gas company, and may easily result in gas disputes between the gas user and the gas company. However, due to a large number of gas meters, it is difficult for the gas company to check each gas meter to eliminate the problem.

Therefore, it is desirable to provide a method and Internet of Things system for determining a gas meter maintenance plan of smart gas, so as to realize an online inspection of the gas meters, improve a processing efficiency, and reduce the losses.

SUMMARY

One or more embodiments of the present disclosure provide a method for determining a gas meter measurement failure of a smart gas. The method is implemented by an Internet of Things (IoT) system, including: a smart gas user platform, a smart gas service platform, a smart gas device management platform, a smart gas sensing network platform, and a smart gas object platform that interact in sequence, the smart gas device management platform includes an indoor smart gas device management sub-platform and a smart gas data center; the method including: by the smart gas data center, obtaining, based on the smart gas sensing network platform, gas flow information of each level of pipelines from at least one flow monitoring device, the at least one flow monitoring device being configured in the smart gas object platform; by the indoor smart gas device management sub-platform, determining a candidate area based on the gas flow information; determining a target gas meter based on gas meter reading information of the candidate area, and then determining a maintenance plan for the target gas meter; and sending the maintenance plan to the smart gas data center, and sending the maintenance plan to the smart gas user platform based on the smart gas service platform.

One or more embodiments of the present disclosure provide an IoT system for determining a gas meter measurement failure of a smart gas, the IoT system includes: a smart gas user platform, a smart gas service platform, a smart gas device management platform, a smart gas sensing network platform, and a smart gas object platform that interact in sequence, the smart gas device management platform includes an indoor smart gas device management sub-platform and a smart gas data center; the smart gas data center is configured to: obtain, based on the smart gas sensing network platform, gas flow information of each level of pipelines from at least one flow monitoring device, and the at least one flow monitoring device is configured in the smart gas object platform; the indoor smart gas device management sub-platform is configured to: determine a candidate area based on the gas flow information; determine a target gas meter based on gas meter reading information of the candidate area, and then determine a maintenance plan for the target gas meter; and send the maintenance plan to the smart gas data center, and send the maintenance plan to the smart gas user platform based on the smart gas service platform.

One or more embodiments of the present disclosure provide a device for determining a gas meter measurement failure of a smart gas, including a processor for executing the above method for determining a gas meter measurement failure of a smart gas.

One or more embodiments of the present disclosure provide a non-transitory computer-readable storage medium storing computer instructions, when the computer instructions are executed by a processor, a computer implements the method for determining a gas meter measurement failure of a smart gas.

BRIEF DESCRIPTION OF THE DRAWINGS

The present disclosure is further described in terms of exemplary embodiments. These exemplary embodiments are described in detail with reference to the drawings. These embodiments are not limiting, and in these embodiments, the same numbers refer to the same structures, wherein.

DETAILED DESCRIPTION

To illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the terms "system", "device", "unit" and/or "module" used in the specification are means used to distinguish different components, elements, parts, segments, or assemblies. However, these words may be replaced by other expressions if they serve the same purpose.

As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated operations and/or components, but do not preclude the presence or addition of one or more other operations and/or components thereof.

The flowcharts used in the present disclosure illustrate operations that systems implement according to some embodiments in the present disclosure It should be understood that the operations of the flowchart may not necessarily be implemented in order. Conversely, the operations may be implemented in inverted order, or simultaneously Moreover, one or more other operations may be added into the flowcharts. One or more operations may be removed from the flowcharts FIG. 1 is a schematic diagram illustrating a structure of a system for determining a gas meter measurement failure according to some embodiments of the present disclosure.

Figure 1:
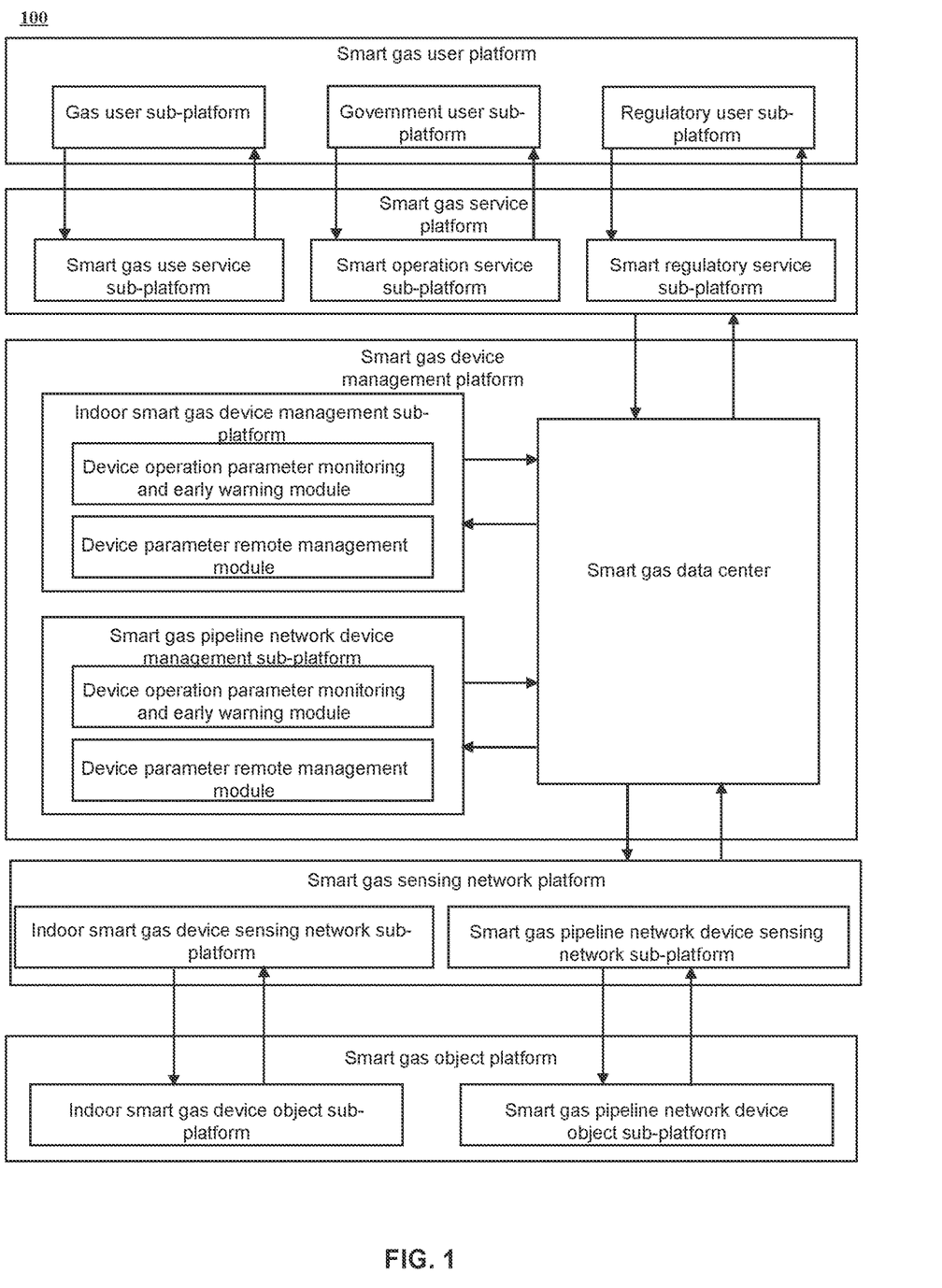
FIG. 1 is a schematic diagram illustrating a structure of a system for determining a gas meter measurement failure according to some embodiments of the present disclosure.

As shown in FIG. 1, an IoT system 100 may include a smart gas user platform, a smart gas service platform, a smart gas device management platform, a smart gas sensing network platform, and a smart gas object platform.

The smart gas user platform may be dominated by a user, including a platform that obtains the user's demands and feeds back information to the user. In some embodiments, the smart gas user platform may be configured as a terminal device. For example, a desktop computer, a tablet computer, a notebook computer, a mobile phone and other intelligent electronic devices that realize a data processing and data communication.

In some embodiments, the smart gas user platform may include a gas user sub-platform, a government user sub-platform, and a regulatory user sub-platform. The gas user sub-platform is for a gas user, and the gas user sub-platform may be configured to receive reminder information sent by the smart gas service sub-platform, such as a gas meter maintenance plan, the reminder information of a gas meter abnormity, etc. The government user sub-platform is for a government user, and the government user sub-platform may be configured to receive gas operation information and gas device operation information sent by a smart operation service sub-platform, and send a gas operation information query instruction and a gas operation device information query instruction to the smart operation service sub-platform. The regulatory user sub-platform is for a regulatory user (such as the user of a safety regulation department), and the regulatory user sub-platform may be configured to receive the safety regulatory information and gas device operation information sent by a smart regulatory service sub-platform, as well as send a safety regulatory information query instruction and a gas device operation information query instruction to the smart regulatory service sub-platform.

The smart gas service platform may be a platform for receiving and transmitting data and/or information. For example, the smart gas service platform may be configured to receive the gas meter maintenance plan uploaded by a smart gas data center of the smart gas device management platform, and send the gas meter maintenance plan to the smart gas user platform. In some embodiments, the smart gas service platform may further be configured to receive a query instruction (e.g., the gas operation information query instruction, the safety regulatory information query instruction, etc.) issued by the smart gas user platform, and send the query instruction to the smart gas data center of the smart gas device management platform. In some embodiments, the smart gas service platform may be provided with a smart gas use service sub-platform, the smart operation service platform and the smart regulatory service sub-platform.

In some embodiments, the smart gas use service sub-platform may receive the gas meter maintenance plan uploaded by the smart gas data center of the smart gas device management platform, and transmit the gas meter maintenance plan to the gas user sub-platform. In some embodiments, the smart operation service sub-platform and the smart regulatory service sub-platform may respectively receive the relevant operation information of the gas device uploaded by the smart gas data center of the smart gas device management platform, and respectively transmit the relevant operation information to the government user sub-platform and the regulatory user sub-platform. The smart operation service sub-platform and the smart regulatory service sub-platform may further be configured to respectively receive the query instruction sent by the government user sub-platform and the regulatory user sub-platform, and send the query instruction to the smart gas data center of the smart gas device management platform.

A smart gas management platform may coordinate the connection and collaboration between various functional platforms, gather all the information of the IoT, and provide perception management and control management functions for the IoT operation system. For example, the smart gas device management platform may be configured to receive the gas device operation information transmitted by the smart gas sensing network platform, such as gas flow information of each level of pipelines, etc., and determine a candidate area, and determine a target gas meter and its maintenance plan based on gas meter reading information in the candidate area. In some embodiments, the smart gas device management platform may include an indoor smart gas device management sub-platform, a smart gas pipeline network device management sub-platform, and the smart gas data center. The indoor smart gas device management sub-platform and the smart gas pipeline network device management sub-platform may include a device operation parameter monitoring and early warning module, and a device parameter remote management module.

The device operation parameter monitoring and early warning module may be configured to check a current operation parameter and a historical operation parameter of the gas device (e.g., a gas meter, etc.), and perform monitoring and early warning based on a preset threshold. When the operation parameter of the gas device is abnormal (for example, greater than the preset threshold, etc.), the government user and/or the regulatory user may directly switch from the device operation parameter monitoring and early warning module to the device parameter remote management module to perform remote processing on the device parameter. When the remote processing fails or does not work well, the government user and/or the regulatory user may send the reminder information (such as the gas meter maintenance plan, etc.) to the gas user sub-platform through the smart gas service sub-platform. The device parameter remote management module may be configured to remotely adjust and set the device parameter of the smart gas object platform, and may further be configured to remotely authorize the device parameter adjustment initiated by the smart gas object platform on site.

In some embodiments, the smart gas data center may receive the gas flow information of each level of pipelines and the gas meter reading information in the candidate area sent by the smart gas sensing network platform, and send the data to the smart gas pipeline network device management sub-platform and the indoor smart gas device management sub-platform respectively for processing. After processed by the smart gas device management sub-platform, the data may be sent to the smart gas data center. The smart gas data center summarizes and stores the processed data and then send it to the smart gas service platform, and pass the data to the smart gas user platform through the smart gas service platform.

The smart gas sensing network platform may be a platform for processing, storing and transmitting data and/or information. For example, the smart gas sensing network platform may be configured to receive the gas flow information obtained by the smart gas object platform and transmit it to the smart gas device management platform. In some embodiments, the smart gas sensing network platform may be configured as a communication network and gateway. In some embodiments, the smart gas sensing network platform may include an indoor smart gas device sensing network sub-platform and a smart gas pipeline network device sensing network sub-platform. The indoor smart gas device sensing network sub-platform may be configured to receive the gas device operation information (for example, the reading information of the gas meter, etc.) of an indoor smart gas device object sub-platform (for example, the gas meter in the user's home, etc.), and send the gas device operation information to the smart gas data center. The smart gas pipeline network device sensing network sub-platform may be configured to receive the gas device operation information of the smart gas pipeline network device object sub-platform (for example, a gas pipeline section, a valve device, etc.), and send the gas device operation information to the smart gas data center.

The smart gas object platform may be a functional platform for obtaining data and/or information related to an object. For example, the smart gas object platform may be configured to obtain operation information of a gas device.

In some embodiments, the smart gas object platform may be configured as various types of gas devices. In some embodiments, the smart gas object platform may include the smart gas indoor device and the smart gas pipe network device. The smart gas indoor device may be configured to obtain the operation information of the indoor device (for example, the gas meter, etc.), and upload the operation information to the smart gas data center through the indoor smart gas device sensing network sub-platform. The smart gas pipeline network device may be configured to obtain the operation information of the pipeline network device (for example, a gas pipeline section, etc.), and upload the operation information to the smart gas data center through the smart gas pipeline network device sensing network sub-platform.

In some embodiments of the present disclosure, a gas meter maintenance plan determination system is built through the IoT functional architecture of five platforms, wherein the smart gas device management platform adopts a combination of the sub-platform and the data center, and the smart gas user platform, the gas service platform, the smart gas sensing network platform and the smart gas object platform all adopt an approach of multiple sub-platform arrangement, which ensures an dependency of each data, and ensures classified transmission and tractability of the data, and ensures classified issuance and processing of the instructions, making the structure and data processing of the IoT clear and controllable, and facilitate the management, control and data processing of the IoT.

It should be noted that the above description of the gas meter maintenance plan determination system is only for the convenience of description, and cannot limit the present disclosure to the scope of the illustrated embodiments. It should be understood that for those skilled in the art, after understanding the principle of the system, various modules may be combined arbitrarily, or a sub-system may be formed to connect to other modules without departing from the principle.

Figure 2:
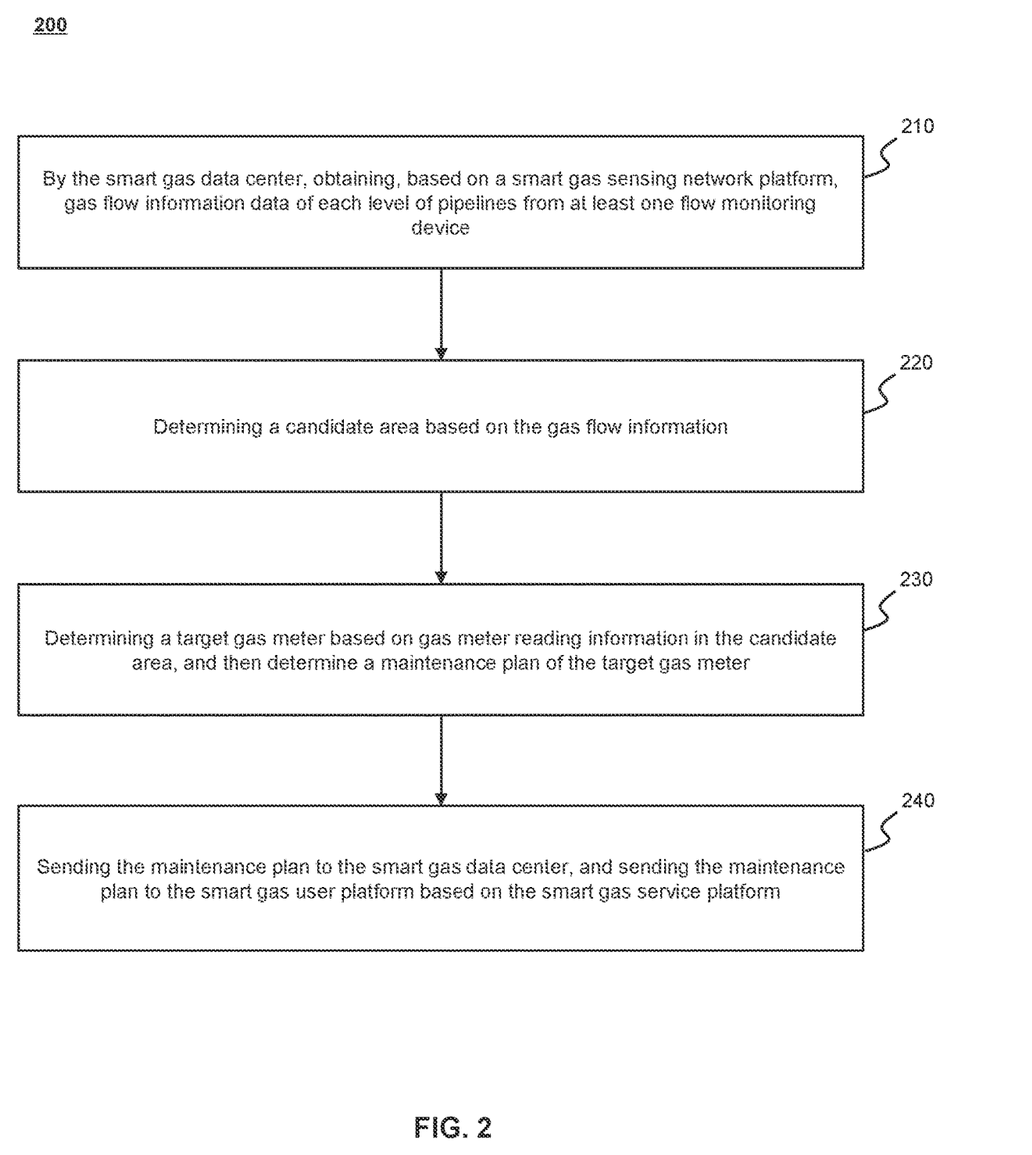
FIG. 2 is a flowchart illustrating an exemplary method for determining the gas meter measurement failure according to some embodiments of the present disclosure.

FIG. 2 is an exemplary flowchart illustrating a method for determining the gas meter measurement failure according to some embodiments of the present disclosure. In some embodiments, a process 200 may be performed by the smart gas device management platform. As shown in FIG. 2, the process 200 includes the following operations.

In 210, the smart gas data center obtains, based on a smart gas sensing network platform, gas flow information data of each level of pipelines from at least one flow monitoring device.

The each level of pipelines (also referred to as pipelines in each level) may refer to gas pipelines used in a process of gas transmission. For example, the each level of pipelines may include, but are not limited to, a main pipeline, a sub-pipeline, and/or an entry pipeline, or the like. One main pipeline may be connected to a plurality of sub-pipelines, and one sub-pipeline may be connected to a plurality of entry pipelines. A flow monitoring device may be installed at nodes of the pipelines (such as the intersections and endpoints of the pipelines) to monitor the gas flow.

The gas flow information may refer to the gas flow transmitted by a pipeline in a unit time.

In some embodiments, the smart gas data center may determine the gas flow information of each level of pipelines from a node at the upper level to a node at the lower level level by level. The smart gas data center may obtain gas flow information in a variety of feasible ways. For example, the gas flow information may be determined based on monitoring data of the flow monitoring device at different time points. For another example, the gas flow information may further be determined by a mathematical approach according to a cross-sectional area of each level of the pipelines, a gas flow speed and a gas pressure.

In 220, determining a candidate area based on the gas flow information.

The candidate area may refer to an area of a pipeline where the gas flow information is abnormal, which may be caused by, such as, a failure of the gas meter (such as an inaccurate reading) and/or a mismatch of the gas flow information of the upper and lower pipelines caused by a gas leakage, etc. For example, the candidate area may include the area of the pipeline where a gas meter reading is inaccurate.

In some embodiments, the indoor smart gas device management sub-platform may determine the candidate area through various approaches such as a mathematical induction, a statistical analysis, a functional calculation and/or a modeling analysis, etc. For example, the indoor smart gas device management sub-platform may determine the candidate area based on a total gas flow input to a node and a total gas flow output from the node. When the input and output gas flow do not match, the area corresponding to the node may be determined as the candidate area.

In some embodiments, the indoor smart gas device management sub-platform may determine whether the area is the candidate area by determining whether a flow consistency rate of the area relating to each pipeline of each level satisfies a first preset condition.

An area relating to each pipeline of each level may refer to an area where starting ends, tail ends of each level of the pipelines, and the pipelines of the next level are located. For example, if a main pipeline includes 3 sub-pipelines, and the 3 sub-pipelines include 310 entry pipelines, the area of the main pipeline may include the area where the main pipeline is located, and the area where the 3 sub-pipelines and the 310 entry pipelines are located.

The flow consistency rate may reflect whether the flows of the input gas and the output gas in the areas of each level of the pipelines are consistent. For example, when the gas flow information of the node at the upper level and the node at the lower level of a main pipeline is the same, the flow consistency rate is 100%.

In some embodiments, the indoor smart gas device management sub-platform may determine whether the gas meter is failed and/or whether there is the gas leakage in the pipeline according to the flow consistency rate of the node at the upper level and the node at the lower level. For example, when the flow consistency rate of the node at the current level and the flow consistency rate of all nodes of the lower level sub-pipelines are 100%, it may be determined that the gas meter is normal and there is no leakage. When the flow consistency rate of the node at the current level is 100%, and the flow consistency rate of some nodes of the lower level sub-pipelines are not 100%, then the gas meters of some nodes of the lower level sub-pipelines may be failed or the pipelines may have the gas leakage. When the flow consistency rate of the node at the current level is not 100%, and the flow consistency rate of all nodes of the lower level sub-pipelines are 100%, then the gas meter of the node at the current level may be failed. When the flow consistency rate of the node at the current level is not 100%, and the flow consistency rate of some nodes of the lower level sub-pipelines are not 100%, the flow consistency rates of the node at the upper level and lower level need to be further checked.

In some embodiments, the indoor smart gas device management sub-platform may use various approaches to determine the flow consistency rate. For example, the flow consistency rate may be determined by calculating the gas flow information of each level of the pipelines, and then based on a ratio of the gas flow of the upper pipeline (also referred to as upper level pipeline or pipeline of an upper level) to a sum of the gas flows of all sub-pipelines of the upper pipeline, the flow consistency rate may be determined. More contents about the flow consistency rate, please refer to FIG. 3 and its related descriptions.

The first preset condition may refer to a preset rule for determining whether the flow consistency rate satisfies a requirement. For example, the first preset condition may be that the flow consistency rate is greater than a threshold, such as 96%. When the flow consistency rate of the area of a certain pipeline is greater than the threshold required by the first preset condition, the area may be determined as the candidate area.

In some embodiments of the present disclosure, by determining whether gas flow is abnormal based on the determination of whether the gas flow information of each level of the pipelines is consistent, the candidate area may be determined, which is more realistic and accurate, thereby facilitating a subsequent analysis of the candidate areas, so as to improve an analysis efficiency.

In 230, determining a target gas meter based on gas meter reading information in the candidate area, and determining a maintenance plan of the target gas meter.

The target gas meter may refer to a gas meter with abnormal gas meter reading information. For example, the target gas meter may include a gas meter that cannot read and/or with an inaccurate reading.

It is worth noting that when the flow rate consistency does not meet the first preset condition, there may be the gas meter failure or the gas leakage in the pipeline. Correspondingly, a situation of gas leakage in the pipeline may be excluded based on the gas meter reading information in the candidate area, and then the target gas meter may be determined. For more contents on the excluding gas leakage, please refer to FIG. 4 and its related descriptions.

The maintenance plan may refer to a predetermined maintenance plan for at least one gas meter with an abnormal reading. For example, the maintenance plan may include, but not limited to, a maintenance sequence, a maintenance time and/or a maintenance operation, or the like. In some embodiments, the indoor smart gas device management sub-platform may determine the maintenance plan by checking a preset maintenance comparison table according to an abnormal type. The preset maintenance comparison table includes abnormity types and maintenance plans in a one-to-one corresponding relationship.

In 240, sending the maintenance plan to the smart gas data center, and sending the maintenance plan to the smart gas user platform based on the smart gas service platform.

For more contents on the platforms and how to send the maintenance plan, please refer to FIG. 1 and the related descriptions.

In some embodiments of the present disclosure, performing analysis step by step from upper level to lower level of each of the pipelines based on a big data analysis result of the each of the pipelines and the gas meters helps to determine the area with abnormal gas flow and the gas meters with abnormal readings more accurately and efficiently. As a result, the maintenance plan may be formulated based on the abnormal gas meters in a more targeting manner, thereby improving the processing efficiency, and saving a labor cost and a time cost.

It should be noted that the above description about the process 200 is only for the purpose of illustration, and does not limit the scope of application of the present disclosure. For those skilled in the art, various modifications and changes can be made to the process 200 under the guidance of the present disclosure. However, these modifications and changes are still within the scope of the present disclosure.

Figure 3:
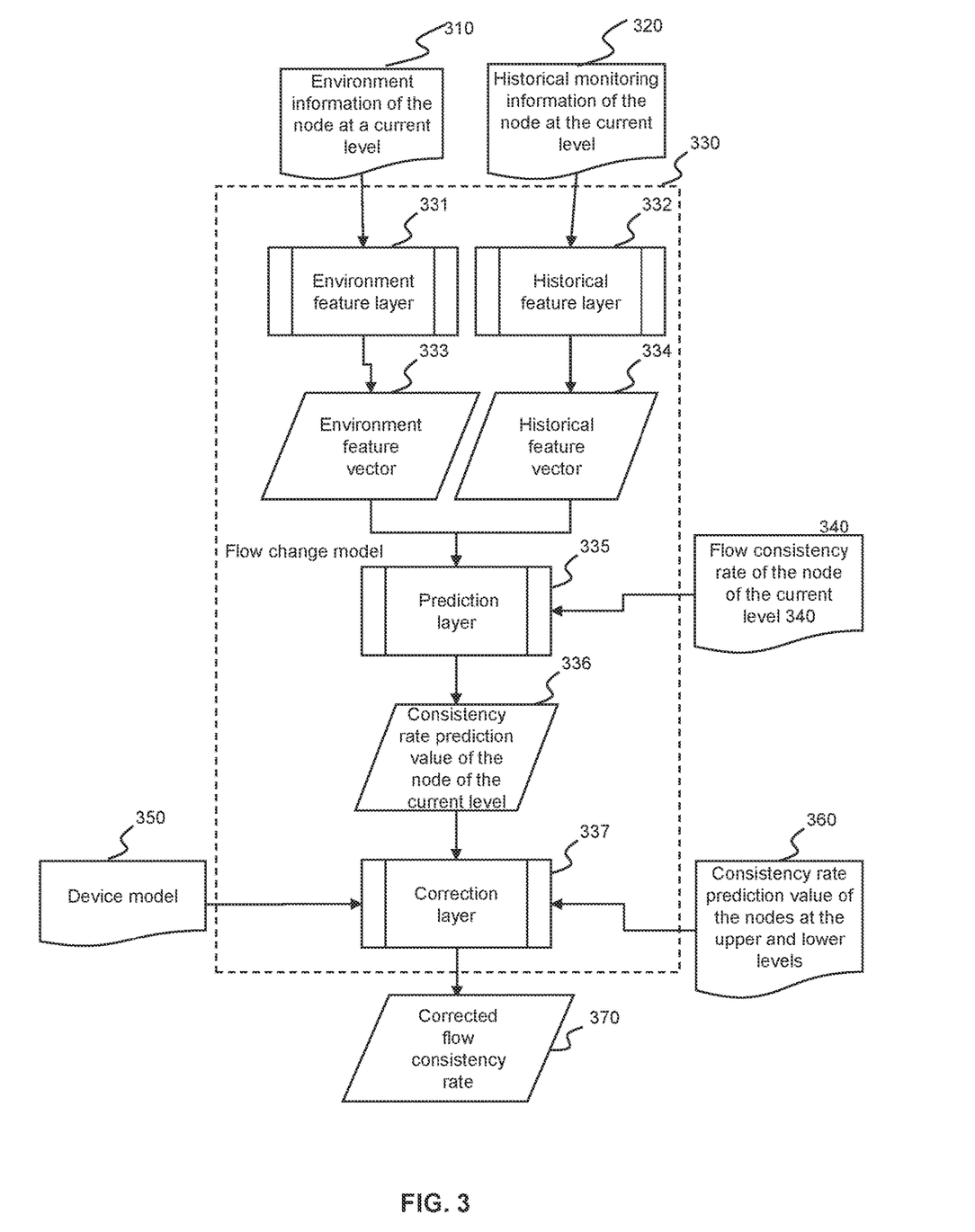
FIG. 3 is a schematic diagram illustrating an exemplary process for correcting a flow consistency rate according to some embodiments of the present disclosure.

FIG. 3 is an exemplary schematic diagram illustrating a process of correcting a flow consistency rate according to some embodiments of the present disclosure.

It can be understood that due to differences in an obtaining approach of an environment temperature, a humidity, an atmospheric pressure and a gas flow information, there may be an error in the obtained gas flow data, resulting in that the flow consistency rate determined based on the gas flow information cannot meet a requirement, so that the flow consistency rate needs to be corrected. For example, a standard working environment of the flow monitoring device is that the temperature is 18° C.~22° C., the atmospheric pressure is 86 kPa~106 kPa, and the relative humidity is 45%~75%. The values measured in other environments may have errors. For another example, if the flow consistency rate in historical monitoring information is not 100%, but no gas leakage or gas meter failure is found during an actual investigation, then the error may be caused by an accumulation of measurement errors of all flow monitoring devices in the area. The error may be corrected using the historical monitoring information and an investigation result. For another example, there are many types of flow monitoring devices, and device models of the flow monitoring devices at nodes at the upper level and the lower level may be different. For example, one device may be a bell-jar mode gas flow monitoring device, and the other may be a standard meter mode gas flow monitoring device. The monitoring devices with different modes may result in errors.

As shown in FIG. 3, the indoor smart gas device management sub-platform may adopt a flow change model 330 to correct the flow consistency rate. The flow change model may be a machine learning model. For example, the flow change model may include any one or a combination of a convolutional neural network model, a deep neural network model, a recurrent neural network model, or other customized model structures.

In some embodiments, the flow change model 330 may include an environmental feature layer 331, a historical feature layer 332, a prediction layer 335 and a correction layer 337.

In some embodiments, an input of the environment feature layer 331 may include environment information 310 of the node at a current level, and an output may include an environment feature vector 333, and the node may include a location where the flow monitoring device is installed in each level of the pipeline. For example, the node may be a start end and end of each level of pipeline. The environment information may include the temperature, the humidity, and the atmospheric pressure data, etc.

In some embodiments, the input of the historical feature layer 332 may include historical monitoring information 320 of the node at the current level, and the output may include a historical feature vector 334. The historical monitoring information may refer to the monitoring information of a past time point, including historical monitoring data (which may be the gas flow information of the past time point) and a historical inspection result (which may be that whether the gas meter has a failure and/or gas leakage times determined in the past), etc.

In some embodiments, the input of the prediction layer 335 may include the environment feature vector 333, the historical feature vector 334, and a flow consistency rate 340 of the node of the current level, and the output may include a consistency rate prediction value of the node of the current level 336. The consistency rate prediction value may refer to a result obtained from predicting the flow consistency rate at the node. For more descriptions on the flow consistency rate, please refer to other contents of the present disclosure (e.g., FIG. 2 and its related content).

In some embodiments, the input of the correction layer 337 may include the consistency rate prediction value of the node at the current level 336, a device model 350 and a consistency rate prediction value of the nodes at the upper and lower level 360, and the output may include a corrected flow consistency rate 370. The device model 350 may be the device model of the flow monitoring device at the nodes at the upper and lower level. The consistency rate prediction value of the nodes at the upper and lower level may be obtained through the environment feature layer, the historical feature layer and the prediction layer with the same parameter structure.

In some embodiments, when the consistency rate prediction value of the nodes at the upper level and/or the lower level cannot be obtained, the flow consistency rate corresponding to the node at the upper and/or lower level may be used as the input of the correction layer 337.

The output of the environment feature layer 331 and the historical feature layer 332 may be the input of the prediction layer 335. The environment feature layer 331, the historical feature layer 332 and the prediction layer 335 may be obtained through a joint training.

In some embodiments, sample data for the joint training includes sample environment information and sample historical monitoring information of sample node, and a label may be the prediction value of the consistency rate of a sample node. The sample environment information and sample historical monitoring information of the sample node may be input to the environmental feature layer and the historical feature layer respectively to obtain an environmental feature vector and a historical feature vector output by the environmental feature layer and the historical feature layer respectively. The environmental feature vector and historical feature vector may be input to the prediction layer to obtain the prediction value of the consistency rate. A loss function may be constructed based on an output result of the label and the prediction layer, and a parameter of the environmental feature layer, the historical feature layer and the prediction layer may be updated at the same time, until the preset condition is satisfied, then the training is completed, and a trained environmental feature layer, historical feature layer, and prediction layer may be obtained. The preset condition may be that the loss function is smaller than a threshold, the loss function converges, or a training period reaches a threshold.

In some embodiments, the correction layer of the flow change model may be obtained by training a plurality of labeled training samples. For example, a plurality sets of labeled training samples may be input to an initial correction layer, the loss function may be constructed based on the output of the initial correction layer and labels, and a parameter of the initial correction layer may be iterated through a gradient descent or other approaches based on the loss function until the loss function satisfies a preset condition. When the model training is completed, a trained correction layer may be obtained. In some embodiments, the training sample may include the prediction value of the consistency rate of the sample node, the prediction value of the consistency rate of the nodes at the upper and lower levels, and the device model at the sample node, and the label of the training sample may include the corrected prediction value of the consistency rate. The training sample may be obtained based on the historical data, and the label of the training sample may be obtained through a manual correction.

In some embodiments of the present disclosure, training the flow change model based on a large amount of extensive data, and by using the trained model, the corrected flow consistency rate may be obtained more efficiently, thereby improving an accuracy of its reflection of the actual condition, and satisfying an analysis demand of the user.

Figure 4:
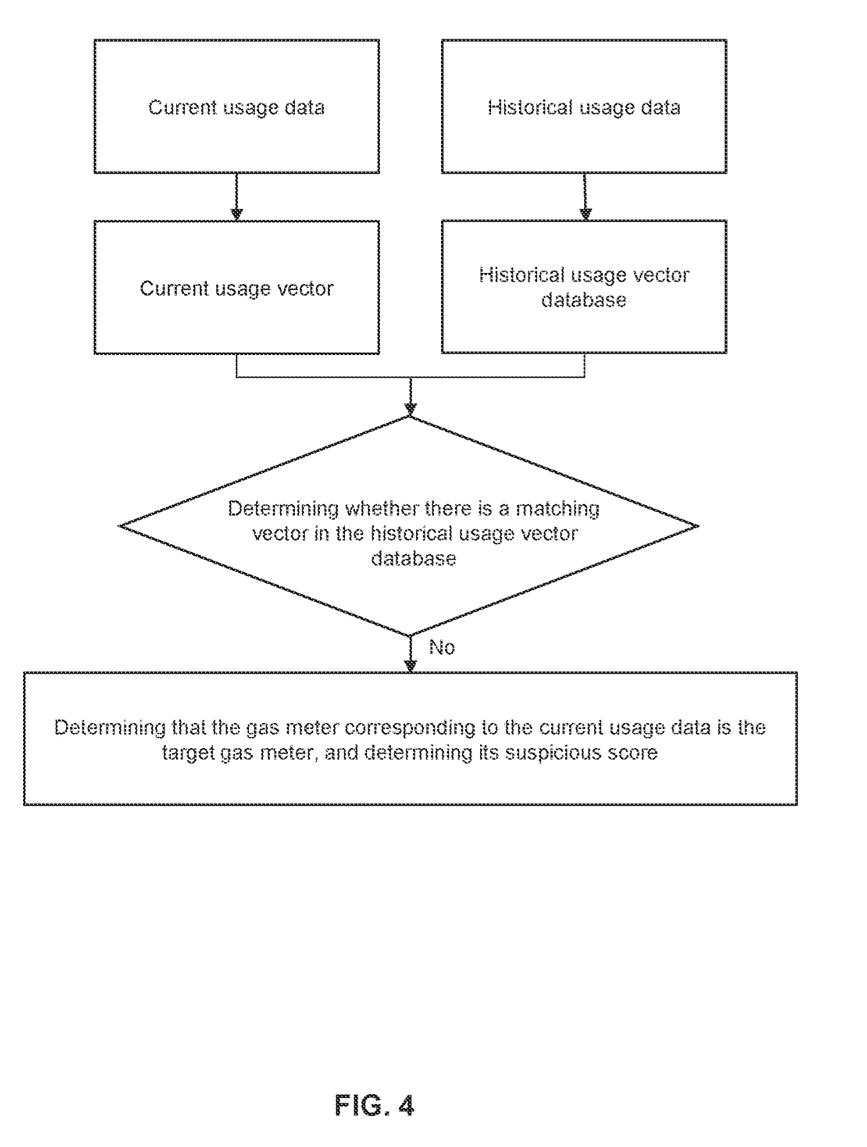
FIG. 4 is a schematic diagram illustrating an exemplary process for determining a target gas meter according to some embodiments of the present disclosure.

FIG. 4 is a schematic diagram illustrating an exemplary process for correcting a flow consistency rate according to some embodiments of the present disclosure.

In some embodiments, the target gas meter may be determined based on current usage data and historical usage data of the gas meter reading information. The current usage data and the historical usage data may respectively reflect a current use and a historical use of gas, and the use may include but not limited to a gas use, a use time and/or a use frequency, etc.

In some embodiments, the target gas meter may be determined in a plurality of approaches. For example, a statistical analysis, a linear fitting and/or a function calculation may be used to analyze and process the current usage data and the historical usage data of the gas meter reading information, and determine the target gas meter based on an analysis result.

In some embodiments, as shown in FIG. 4, the indoor smart gas device management sub-platforms may respectively construct current usage vectors and historical usage vector databases based on the current usage data and the historical usage data of the gas meter reading information.

The current usage vector and the historical usage vector may be vectors constructed according to the current usage data and the historical usage data of the gas meter reading information, respectively, and the historical usage vector database is composed of a plurality of historical usage vectors. The current usage vector or the historical usage vector may be (a, b, c), where a indicates a monthly usage amount at the current month, b indicates a daily usage amount at the current date, and c indicates a usage amount in a fixed time period at the current date. For example, if the current monthly usage amount, daily usage amount, and usage amount in a fixed time period of a gas user are 30 cubic meters, 1.2 cubic meters, and 0.76 cubic meters, respectively, the current usage vector may be constructed as (30, 1.2, 0.76), where, the fixed time period may be a time period in which the gas user has a higher possibility of using gas. For example, the fixed time period may be 10:00-14:00.

In some embodiments, the current usage vector and the historical usage vector may further include an environmental feature sub-vector, wherein the environmental feature sub-vector may be determined based on an environmental feature vector output by an environmental feature layer of a flow change model. For more contents of the environmental feature vector and the environmental feature layer, please refer to FIG. 3 and its related description.

In some embodiments of the present disclosure, by adding the environmental feature sub-vector to the current usage vector and the historical usage vector, the influence of environmental factors on the gas usage data of the gas user is fully considered, so that the construction of the vector is more in line with the actual situation.

In some embodiments, the indoor smart gas device management sub-platform may determine whether the current usage vector has a matching vector in the historical usage vector database. Exemplarily, whether there is a matching vector in the historical usage vector database may be determined according to the vector distance between the current usage vector and the historical usage vector. The calculation approach of the vector distance may include but not limited to a Euclidean distance, a Manhattan distance, or a Chebyshev distance, etc. For example, a distance threshold may be set. When the vector distances between the current usage vector and all the historical usage vectors in the historical usage vector database are greater than the threshold, the indoor smart gas device management sub-platform may determine that there is not a vector matching the current usage vector in the historical usage vector database.

In some embodiments, in response to the determination that there is not a vector matching the current usage vector in the historical usage vector database, the indoor smart gas device management sub-platform may determine that the gas meter corresponding to the current usage data is the target gas meter, and determine its suspicious score.

The suspicious score may be used to indicate a possibility that the target gas meter is actually abnormal. It may be understood that the higher the suspicious score, the greater the possibility of the corresponding target gas meter being abnormal.

In some embodiments, the suspicious score may be positively correlated with a minimum vector distance of the current usage vector in the historical usage vector database. For example, the suspicious score may be determined based on the minimum vector distance between the current usage vector and the historical usage vector in the historical usage vector database. It may be understood that the greater the minimum vector distance, the higher the suspicious score.

When the current usage vector has the matching vector in the historical usage vector database, it may be determined that there is no abnormity in the gas meter, and meanwhile, it may be determined that there may be a gas leakage in the pipeline.

In some embodiments of the present disclosure, it is more reasonable and grounded to determine whether the reading data of the gas meter is abnormal by comparing and analyzing the current usage data and the historical usage data of the gas meter, and then to determine the target gas meter.

Figure 5:
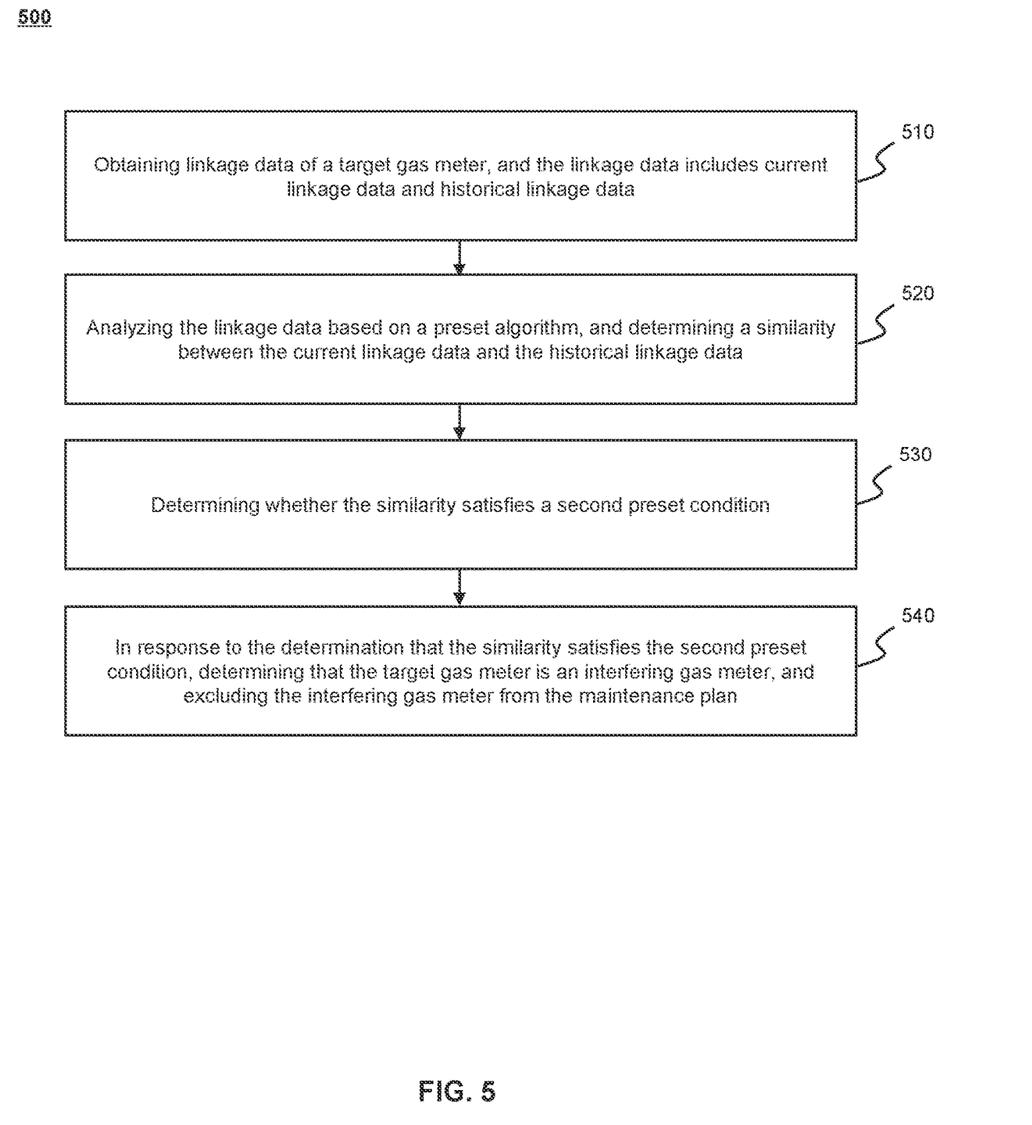
FIG. 5 is a flowchart illustrating an exemplary process for excluding an interfering gas meter according to some embodiments of the present disclosure.

FIG. 5 is a flowchart illustrating an exemplary process for excluding an interfering gas meter according to some embodiments of the present disclosure. As shown in FIG. 5, the process 500 includes the following operations.

In 510, obtaining linkage data of a target gas meter, the linkage data including current linkage data and historical linkage data.

The linkage data may refer to other living data of a user corresponding to the target gas meter. For example, the linkage data may include water usage data and electricity usage data of the user corresponding to the target gas meter.

The current linkage data and the historical linkage data may respectively reflect a current situation and a historical situation of the linkage data. For example, the current linkage data may include a current month-usage amount, a current day-usage amount, a usage time and a usage frequency, or the like. The historical linkage data may include a historical month-usage amount, a historical day-usage amount, a historical usage time, and a historical usage frequency.

In some embodiments, the linkage data may be obtained in various approaches. In some embodiments, the smart gas object platform may further include other monitoring devices, such as a water meter, an electricity meter, etc., of the user's household. The smart gas indoor device sub-platform may obtain the water usage data and the electricity usage data of the target gas meter by obtaining the reading information of the water meter and the electricity meter of the user corresponding to the target gas meter. In some embodiments, the linkage data may further be obtained through a third-party platform. For example, a property system, a power network system, etc., which is not limited in the present disclosure.

In 520, analyzing the linkage data based on a preset algorithm, and determining a similarity between the current linkage data and the historical linkage data.

The similarity may refer to a degree of similarity between the current linkage data and the historical linkage data. In some embodiments, the similarity may include a water use similarity and/or an electricity use similarity.

The preset algorithm may refer to an algorithm for analyzing the linkage data. For example, a deep learning algorithm, a similarity algorithm, etc.

In some embodiments, a current water use vector, a current electricity use vector, the historical water use vector and a historical electricity use vector may be constructed respectively based on the current water use data, the current electricity use data and the historical water use data, and the historical electricity use data, and then based on a vector distance between the current water use vector and the historical water use vector, the vector distance between the current electricity use vector and the historical electricity use vector, corresponding similarities may be determined, which are the water use similarity and the electricity use similarity.

In 530, determining whether the similarity satisfies a second preset condition.

The second preset condition may refer to a threshold of similarity set in advance. When the similarity between the current linkage data and the historical linkage data is greater than the second preset condition, it is considered that the two are not similar; otherwise, the two are considered as being similar.

In 540, in response to the determination that the similarity satisfies the second preset condition, determining that the target gas meter is an interfering gas meter, and excluding the interfering gas meter from the maintenance plan.

The interfering gas meter may refer to a gas meter in the target gas meters that has high suspicious score due to a user factor. For example, a business trip of the user may cause the gas meter to read 0 cubic meter in the current week and 30 cubic meters in the previous week, resulting in an excessively high suspicious score for the gas meter, and the gas meter may be the interfering gas meter.

In some embodiments, when the water use similarity and/or the electricity use similarity satisfies the second preset condition, it may be considered that the suspicious score of the target gas meter is too high due to the user factor, while an actual suspicious score of the target gas meter is lower, so such target gas meter may be identified as the interfering gas meter and may be excluded from the maintenance plan.

In some embodiments of the present disclosure, by analyzing the linkage data, interfering gas meters with low degrees of suspicion can be excluded among the target gas meters, which is beneficial to narrow a scope of investigation and improve a processing efficiency.

The basic concepts have been described above. Obviously, for those skilled in the art, the above detailed disclosure is merely an example, and does not constitute a limitation of the present disclosure. Although not explicitly described herein, various modifications, improvements, and corrections to the present disclosure may be made by those skilled in the art. Such modifications, improvements, and corrections are suggested in the present disclosure, so such modifications, improvements, and corrections still belong to the spirit and scope of the embodiments of the present disclosure.

Meanwhile, the present disclosure uses specific words to describe the embodiments of the present disclosure. Such as "one embodiment," "an embodiment," and/or "some embodiments" means a certain feature, structure, or characteristic associated with at least one embodiment of the present disclosure. Therefore, it should be emphasized and noted that two or more references to "an embodiment" or "one embodiment" or "an alternative embodiment" in various places in the present disclosure are not necessarily referring to the same embodiment. Furthermore, certain features, structures, or characteristics of the one or more embodiments of the present disclosure may be combined as appropriate.

Furthermore, unless explicitly stated in the claims, the order of processing elements and sequences described in the present disclosure, the use of alphanumeric, or the use of other names is not intended to limit the order of the processes and methods of the present disclosure. While the foregoing disclosure discusses by way of various examples of some embodiments of the invention that are presently believed to be useful, it is to be understood that such details are for purposes of illustration only and that the appended claims are not limited to the disclosed embodiments. On the contrary, the claims aim to cover all corrections and equivalences in line with the nature and scope of the embodiments of the present disclosure. For example, although the system components described above may be implemented by hardware devices, they may also be implemented by software-only solutions, such as installing the described systems on existing servers or mobile devices.

Similarly, it should be noted that, in order to simplify the expressions disclosed in the present disclosure and thus help the understanding of one or more embodiments of the present disclosure, in the foregoing description of the embodiments of the present disclosure, various features may sometimes be combined into one embodiment, drawing or description thereof. However, this way of disclosure does not imply that the subject matter of the description requires more features than recited in the claims. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." Unless stated otherwise, "about", "approximately" or "substantially" means that a variation of ±20% is allowed for the stated number. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. It should be noted that, should there be any inconsistency or conflict between the description, definition, and/or the use of a term associated with any of the incorporated material and that associated with the present document, the description, definition, and/or the use of the term in the present document shall prevail.

Finally, it should be understood that the embodiments of the application disclosed herein are illustrative of the principles of the embodiments of the present disclosure. Other variations are also possible within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for determining a gas meter maintenance plan of a smart gas, wherein the method is implemented based on an Internet of Things (IoT) system, including: a smart gas user platform, a smart gas service platform, a smart gas device management platform, a smart gas sensing network platform, and a smart gas object platform that interact in sequence, wherein the smart gas device management platform includes an indoor smart gas device management sub-platform and a smart gas data center;

the method comprising:

by the smart gas data center, obtaining, based on the smart gas sensing network platform, gas flow information of pipelines of each level from at least one flow monitoring device, the at least one flow monitoring device being configured in the smart gas object platform;

by the indoor smart gas device management sub-platform, determining a candidate area based on the gas flow information;

based on current usage data and historical usage data of gas meter reading information of the candidate area, respectively constructing a current usage vector and a historical usage vector database;

determining whether there is a vector matching the current usage vector in the historical usage vector database, wherein the current usage vector and the historical usage vector database further include an environmental feature sub-vector, the environmental feature sub-vector being obtained based on an environmental feature layer of a flow change model, the flow change model being a machine learning model;

in response to the determination that there is not a vector matching the current usage vector in the historical usage vector database, determining that the gas meter corresponding to the current usage data is a target gas meter, determining a suspicious score of the gas meter, wherein the suspicious score is positively correlated with a minimum vector distance of the current usage vector in the historical usage vector database;

determining a maintenance plan of the target gas meter; and sending the maintenance plan to the smart gas data center, and sending the maintenance plan to the smart gas user platform based on the smart gas service platform.

2. The method of claim 1, wherein the determining a candidate area comprises:

determining a flow consistency rate of an area relating to each pipeline of each level, the flow consistency rate being determined according to a ratio of the gas flows in an upper pipeline and a lower pipeline; and in response to the determination that the flow consistency rate does not satisfy a first preset condition, determining the area as the candidate area.

3. The method of claim 2, wherein the determining a flow consistency rate of the area relating to each pipeline in each level further comprises:

correcting the flow consistency rate using the flow change model.

4. The method of claim 3, wherein the flow change model includes the environmental feature layer, a historical feature layer, a prediction layer and a correction layer, wherein:

an input of the environmental feature layer includes environment information of a node at a current level, and an output of the environmental feature layer includes an environmental feature vector, and the node is a position where the flow monitoring device is installed in the pipeline of each level;

the input of the historical feature layer includes historical monitoring information of the node at the current level, and the output of the historical feature layer includes a historical feature vector;

the input of the prediction layer includes the environmental feature vector, the historical feature vector, and the flow consistency rate of the node at the current level, and the output of the prediction layer includes a prediction value of the consistency rate of the node at the current level; and the input of the correction layer includes the prediction value of the consistency rate of the node at the current level, the prediction value of the consistency rate of nodes at the upper and lower levels, and device models of flow monitoring devices at the nodes at the current level and the upper and lower levels, and the output of the correction layer includes a corrected flow consistency rate.

5. The method of claim 1, wherein the determining the target gas meter further comprises:

obtaining linkage data of the target gas meter, wherein the linkage data includes current linkage data and historical linkage data;

analyzing the linkage data based on a preset algorithm, and determining a similarity between the current linkage data and the historical linkage data;

determining whether the similarity satisfies a second preset condition; and in response to the determination that the similarity satisfies the second preset condition, determining that the target gas meter is an interfering gas meter, and excluding the interfering gas meter from the maintenance plan.

6. An Internet of Things (IoT) system for determining a gas meter maintenance plan of a smart gas, wherein the IoT system includes: a smart gas user platform, a smart gas service platform, a smart gas device management platform, a smart gas sensing network platform, and a smart gas object platform that interact in sequence, wherein the smart gas device management platform includes an indoor smart gas device management sub-platform and a smart gas data center;

the smart gas data center is configured to:

obtain, based on the smart gas sensing network platform, gas flow information of pipelines of each level from at least one flow monitoring device, and the at least one flow monitoring device is configured in the smart gas object platform;

the indoor smart gas device management sub-platform is configured to:

determine a candidate area based on the gas flow information;

based on current usage data and historical usage data of gas meter reading information of the candidate area, respectively construct a current usage vector and a historical usage vector database;

determine whether there is a vector matching the current usage vector in the historical usage vector database, wherein the current usage vector and the historical usage vector database further include an environmental feature sub-vector, the environmental feature sub-vector being obtained based on an environmental feature layer of a flow change model, the flow change model being a machine learning model;

in response to the determination that there is not a vector matching the current usage vector in the historical usage vector database, determine that the gas meter corresponding to the current usage data is a target gas meter, determine a suspicious score of the gas meter, wherein the suspicious score is positively correlated with a minimum vector distance of the current usage vector in the historical usage vector database;

determine a maintenance plan of the target gas meter; and send the maintenance plan to the smart gas data center, and send the maintenance plan to the smart gas user platform based on the smart gas service platform.

7. The IoT system of claim 6, wherein, to determine the candidate area, the indoor smart gas device management sub-platform is configured to:

determine a flow consistency rate of an area relating to each pipeline of each level, the flow consistency rate is determined according to a ratio of the gas flows in an upper pipeline and a lower pipeline; and in response to the determination that the flow consistency rate does not satisfy a first preset condition, determine the area as the candidate area.

8. The IoT system of claim 6, wherein, to determine the flow consistency rate of the area relating to each pipeline of each level, the indoor smart gas device management sub-platform is further configured to:

correct the flow consistency rate using the flow change model.

9. The IoT system of claim 8, wherein the flow change model includes the environmental feature layer, a historical feature layer, a prediction layer and a correction layer, wherein:

an input of the environmental feature layer includes environment information of a node at a current level, and an output of the environmental feature layer includes an environmental feature vector, and the node is a position where the flow monitoring device is installed in the pipeline of each level;

the input of the historical feature layer includes historical monitoring information of the node at the current level, and the output includes a historical feature vector;

the input of the prediction layer includes the environmental feature vector, the historical feature vector, and the flow consistency rate of the node at the current level, and the output of the prediction layer includes a prediction value of the consistency rate of the node at the current level; and the input of the correction layer includes the prediction value of the consistency rate of the node at the current level, the prediction value of the consistency rate of nodes at the upper and lower layers, and device models of flow monitoring devices at the nodes at the current level and the upper and lower levels, and the output of the correction layer includes a corrected flow consistency rate.

10. The IoT system of claim 6, wherein to determine the target gas meter, the indoor smart gas device management sub-platform is further configured to:

obtain linkage data of the target gas meter, wherein the linkage data includes current linkage data and historical linkage data;

analyze the linkage data based on a preset algorithm, and determine a similarity between the current linkage data and the historical linkage data;

determine whether the similarity satisfies a second preset condition; and in response to the determination that the similarity satisfies the second preset condition, determine that the target gas meter is an interfering gas meter, and exclude the interfering gas meter from the maintenance plan.

11. A non-transitory computer-readable storage medium storing computer instructions, wherein when the computer instructions are executed by a processor, a computer implements the method for determining a gas meter maintenance plan of a smart gas according to claim 1.

* * * * *